(12) United States Patent
Lin et al.

(10) Patent No.: US 8,899,816 B2
(45) Date of Patent: Dec. 2, 2014

(54) BACKLIGHT MODULE

(75) Inventors: Ya-Lan Lin, Hsin-Chu (TW);
Ching-Feng Chen, Hsin-Chu (TW);
Cheng-Min Tsai, Hsin-Chu (TW);
Ming-Sheng Lai, Hsin-Chu (TW);
Ren-Wei Huang, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 107 days.

(21) Appl. No.: 13/449,327

(22) Filed: Apr. 18, 2012

(65) Prior Publication Data
US 2013/0121025 A1 May 16, 2013

(30) Foreign Application Priority Data
Nov. 10, 2011 (TW) .............................. 100141021 A

(51) Int. Cl.
*F21V 7/04* (2006.01)
*F21V 19/00* (2006.01)
*F21V 8/00* (2006.01)
*F21V 7/00* (2006.01)
*F21S 8/00* (2006.01)

(52) U.S. Cl.
CPC . *F21S 8/00* (2013.01); *F21V 19/00* (2013.01); *G02B 6/002* (2013.01); *F21V 7/00* (2013.01); *G02B 6/0031* (2013.01); *G02B 6/0016* (2013.01)
USPC ........... 362/621; 362/622; 362/610; 362/611; 362/615; 362/619

(58) Field of Classification Search
USPC ......... 362/621, 622, 610, 611, 612, 613, 615, 362/619
See application file for complete search history.

(56) References Cited

U.S. PATENT DOCUMENTS

| 7,380,971 B2* | 6/2008 | Yang et al. ..................... 362/622 |
| 7,859,731 B2* | 12/2010 | Choi ................................. 359/34 |
| 8,167,474 B2* | 5/2012 | Tanoue et al. ................. 362/607 |
| 8,220,979 B2* | 7/2012 | Chang et al. .................. 362/610 |
| 8,506,106 B2* | 8/2013 | Kim et al. ..................... 362/97.1 |
| 8,517,591 B2* | 8/2013 | Nakamoto et al. ............ 362/621 |
| 8,545,087 B2* | 10/2013 | Kim et al. ..................... 362/628 |
| 2008/0025045 A1 | 1/2008 | Mii |
| 2011/0122651 A1* | 5/2011 | Komano ....................... 362/611 |

FOREIGN PATENT DOCUMENTS

| CN | 1815325 A | 8/2006 |
| CN | 101464594 A | 6/2009 |
| CN | 201437963 U | 4/2010 |
| CN | 101893189 A | 11/2010 |

(Continued)

*Primary Examiner* — Jong-Suk (James) Lee
*Assistant Examiner* — Mark Tsidulko
(74) *Attorney, Agent, or Firm* — Winston Hsu; Scott Margo

(57) ABSTRACT

A backlight module includes a light guide plate and a light emitting unit. The light guide plate has a first side surface, a second side surface, and a third side surface. The first side surface is located opposite to the second side surface. A height of the first side surface is greater than a height of the second side surface. The third side surface is located between the first side surface and the second side surface and has a light entrance surface and a light exit surface. The light entrance surface is connected to the first side surface and the light exit surface. The light exit surface is connected to the second side surface. An included angle is formed between the light entrance surface and the light exit surface. The light emitting unit is disposed on the light entrance surface.

14 Claims, 3 Drawing Sheets

(56) References Cited

FOREIGN PATENT DOCUMENTS

| JP | 2003255345 | 9/2003 |
| TW | M317024 | 8/2007 |
| TW | M369472 | 11/2009 |
| TW | M380553 U1 | 5/2010 |
| TW | I340853 | 4/2011 |

* cited by examiner

U S 8,899,816 B2

BACKLIGHT MODULE

BACKGROUND OF THE INVENTION

1. Field of the Invention

The present invention relates to a backlight module, and more specifically, to a backlight module for disposing a light emitting unit on a light entrance surface tilted relative to a light exit surface or a bottom reflection surface of a light guide plate at the same side surface.

2. Description of the Prior Art

Since liquid crystal molecules do not produce light themselves, a common method for driving a liquid crystal display device to display images involves utilizing a backlight module to provide light with sufficient brightness and uniform distribution to the liquid crystal display device. Therefore, a backlight module is one of the major components of a liquid crystal display device.

Please refer to FIG. 1, which is a side view of a backlight module 10 according to the prior art. The backlight module 10 includes a light guide plate 12, a light emitting unit 14, and a reflection cover 16. The light guide plate 12 has a light entrance surface 18 and a light exit surface 20. The light emitting unit 14 is disposed on the light entrance surface 18, and the reflection cover 16 covers the light emitting unit 14. Accordingly, light emitted by the light emitting unit 14 is incident into the light guide plate 12 via the light entrance surface 18 directly or by reflection of the reflection cover 16, and then is emitted out of the light guide plate 12 via the light exit surface 20, so that the light guide plate 12 can provide light with sufficient brightness and uniform distribution to a display panel disposed thereon (not shown in FIG. 1). As shown in FIG. 1, the section of the light guide plate 12 corresponding to the light entrance surface 18 has a gradually-increased thickness so as to make the area of the light entrance surface 18 greater than that of the light emitting area of the light emitting unit 14. In such a manner, efficiency of the backlight module 10 in use of light emitted by the light emitting unit 14 can be improved.

However, since the said design causes a structure with a gradually-increased height (e.g. an inclined surface 22 as shown in FIG. 1) formed between the light exit surface 20 and the light entrance surface 18 of the light guide plate 12, light incident into the light guide plate 12 via the light entrance surface 18 may be emitted out of the light guide plate 12 via the inclined surface 22 so as to cause a hot line problem or a light leakage problem. Furthermore, as shown in FIG. 1, since the backlight module 10 needs an additional containing space formed between the light entrance surface 18 of the light guide plate 12 and the reflection cover 16 for containing the light emitting unit 14, the overall width of the backlight module 10 is increased accordingly, so as to be disadvantageous to narrow a side frame of a liquid crystal display device where the backlight module 10 is installed.

SUMMARY OF THE INVENTION

The present invention provides a backlight module. The backlight module includes a light guide plate and a light emitting unit. The light guide plate has a first side surface, a second side surface, and a third side surface. The first side surface is located opposite to the second side surface. A height of the first side surface is greater than a height of the second side surface. The third side surface is located between the first side surface and the second side surface and has a light entrance surface and a light exit surface. The light entrance surface is connected to the first side surface and the light exit surface. The light exit surface is connected to the second side surface. An included angle is formed between the light entrance surface and the light exit surface. The light emitting unit is disposed on the light entrance surface.

The present invention further provides a backlight module. The backlight module includes a light guide plate and a light emitting unit. The light guide plate has a light exit portion and a light entrance portion. The light exit portion has a light exit surface. The light entrance portion has a first section connected to the light exit portion and a second section away from the light exit portion. A thickness of the second section is greater than a thickness of the first section. The light entrance portion has a light entrance surface extendedly formed between the first section and the second section. The light emitting unit is disposed on the light entrance surface for emitting light to be incident into the light guide plate via the light entrance surface and be emitted out of the light guide plate via the light exit surface.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
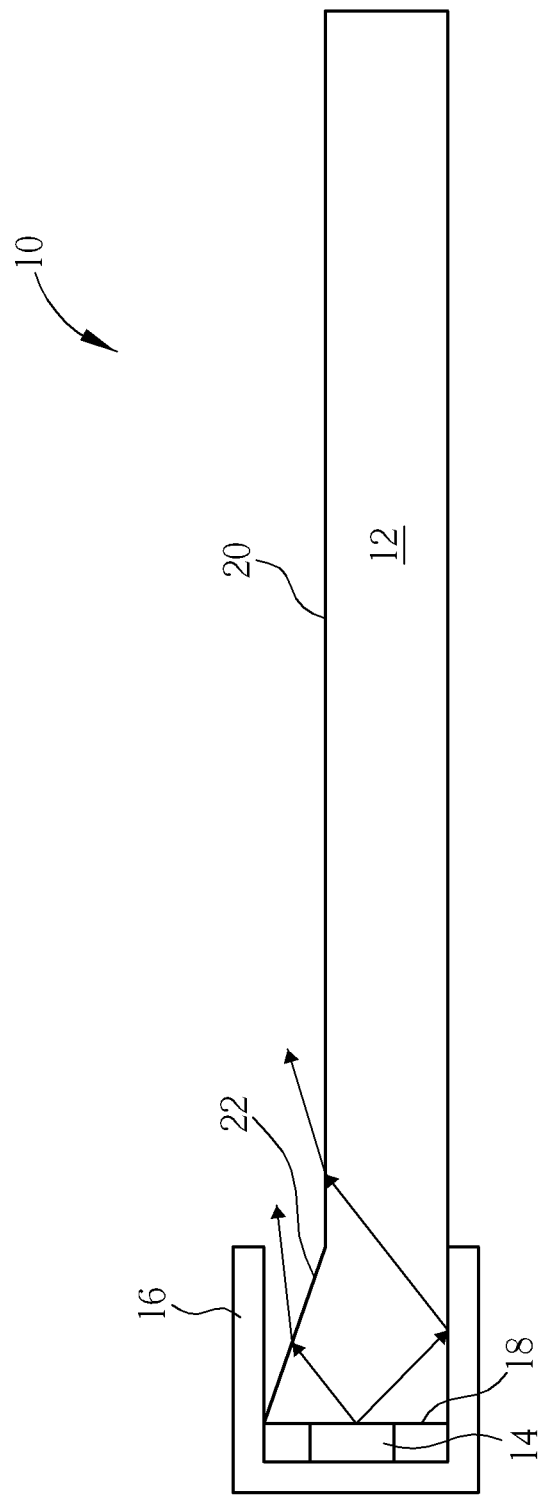
FIG. 1 is a side view of a backlight module according to the prior art.
Figure 2:
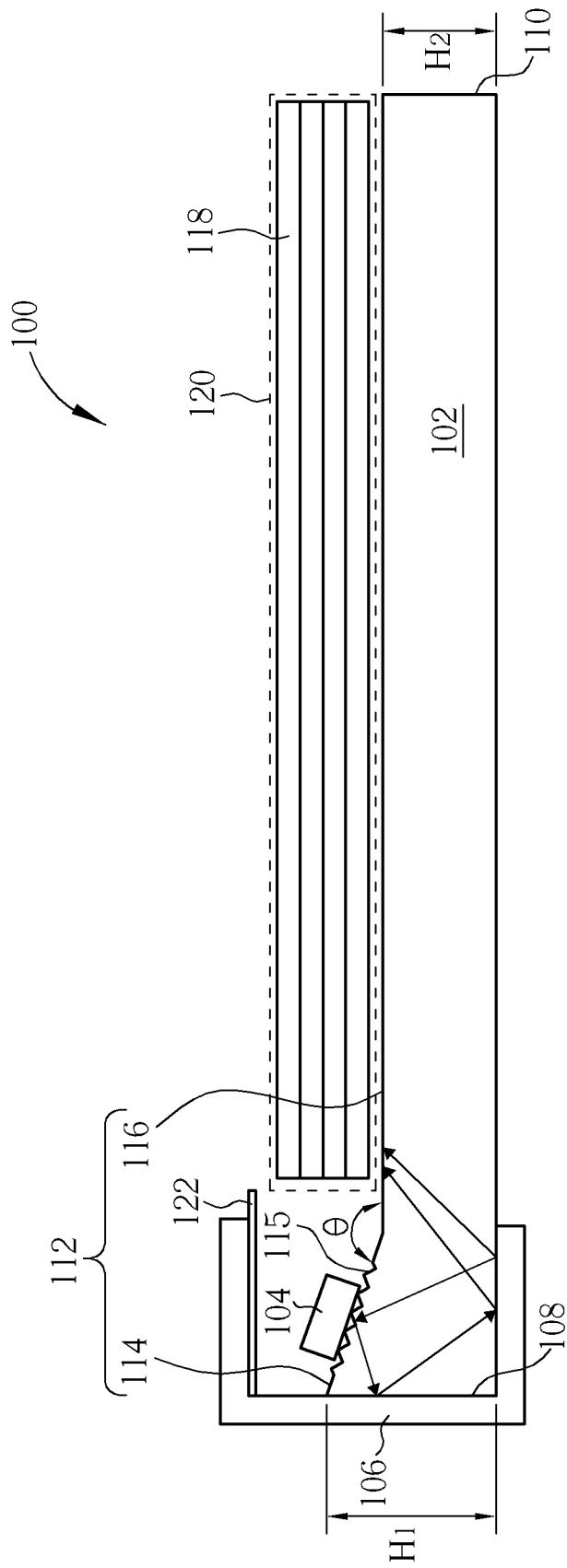
FIG. 2 is a side view of a backlight module according to a first embodiment of the present invention.

Please refer to FIG. 2, which is a side view of a backlight module 100 according to a first embodiment of the present invention. As shown in FIG. 2, the backlight module 100 includes a light guide plate 102, a light emitting unit 104, and a reflection cover 106. The light guide plate 102 has a first side surface 108, a second side surface 110, and a third side surface 112. The first side surface 108 is opposite to the second side surface 110, and a height $H_1$ of the first side surface 108 is greater than a height $H_2$ of the second side surface 110. The third side surface 112 is located between the first side surface 108 and the second side surface 110 and has a light entrance surface 114 and a light exit surface 116. The light entrance surface 114 is adjacent to the first side surface 108 and the light exit surface 116, and the light exit surface 116 is adjacent to the second side surface 110. An angle θ is included between the light entrance surface 114 and the light exit surface 116, meaning that the light entrance surface 114 is tilted upwardly relative to the light exit surface 116.

The light emitting unit 104 is disposed on the light entrance surface 114 and is preferably an LED (Light Emitting Diode) for emitting light to be incident into the light guide plate 102 via the light entrance surface 114. In this embodiment, a microstructure 115 is formed on the light entrance surface 114 for reducing the occurring probability of total reflection of the light so as to enhance light incident efficiency of the light emitting unit 104 relative to the light guide plate 102. As for the structural design of the microstructure 115, it is commonly seen in the prior art, such as a continuous tooth-shaped structure. The reflection cover 106 is disposed on the light guide plate 102 corresponding to the light entrance surface 114 and the first side surface 108 for reflecting the light emitted by the light emitting unit 104, so as to make the light be emitted out of the light guide plate 102 via the light exit surface 116 more efficiently.

In such a manner, via the design that the light emitting unit 104 is disposed on the light entrance surface 114 tilted relative to the light exit surface 116 at the same side surface (i.e. the third side surface 112), the light emitted by the light emitting unit 104 can be incident into the light guide plate 102 via the light entrance surface 114 more efficiently as shown in FIG. 2, and then be emitted out of the light guide plate 102 via the light exit surface 116. Accordingly, the backlight module 100 can provide light with sufficient brightness and uniform distribution. Furthermore, as shown in FIG. 2, the backlight module 100 further includes at least one optical film 118. The optical film 118 can be a conventional film component applied to a liquid crystal display device, such as a diffusing film, for receiving light emitted out of the light guide plate 102 via the light exit surface 116, such that the overall uniformity of the light can be improved by the optical characteristic of the optical film 118. In this embodiment, the light entrance surface 114 can define a containing space 120 (depicted by dotted lines in FIG. 2) cooperatively with the light exit surface 116. The containing space 120 is located above the light exit surface 116. Accordingly, the optical film 118 can be contained in the containing space 120 so that efficiency of the backlight module 100 in use of its inner space can be improved.

Furthermore, since there is no need for the backlight module 100 to additionally dispose a containing space between the first side surface 108 of the light guide plate 102 and the reflection cover 106 to contain the light emitting unit 104, the first side surface 108 of the light guide plate 102 can abut against the reflection cover 106 tightly. In such a manner, the overall width of the backlight module 100 can be reduced accordingly, so as to be advantageous to narrow a side frame of a liquid crystal display device where the backlight module 100 is installed.

In practical application, the backlight module 100 further includes a reflection pad 122 attached to the reflection cover 106 corresponding to the light emitting unit 104. Via the configuration that the reflection pad 122 is disposed above the light emitting unit 104, even if the light emitted by the light emitting unit 104 is reflected by the light entrance surface 114, the backlight module 100 can still utilize the reflection pad 122 to reflect the light back into the light guide plate 102. Thus, efficiency of the backlight module 100 in use of light can be further improved.

To be noted, the light reflection design utilized by the backlight module 100 is not limited to the design that the reflection cover 106 is disposed on the first side surface 108 of the light guide plate 102 as shown in FIG. 2. That is to say, the reflection cover 106 can be an omissible component for simplifying the structural design of the backlight module 100. On condition that the reflection cover 106 is omitted, a side reflection surface for reflecting light can be directly formed on the first side surface 108. As for how to form the side reflection surface on the first side surface 108, the related design is commonly seen in the prior art, such as attaching a reflection tape onto the first side surface 108, and its related description is therefore omitted herein.

Figure 3:
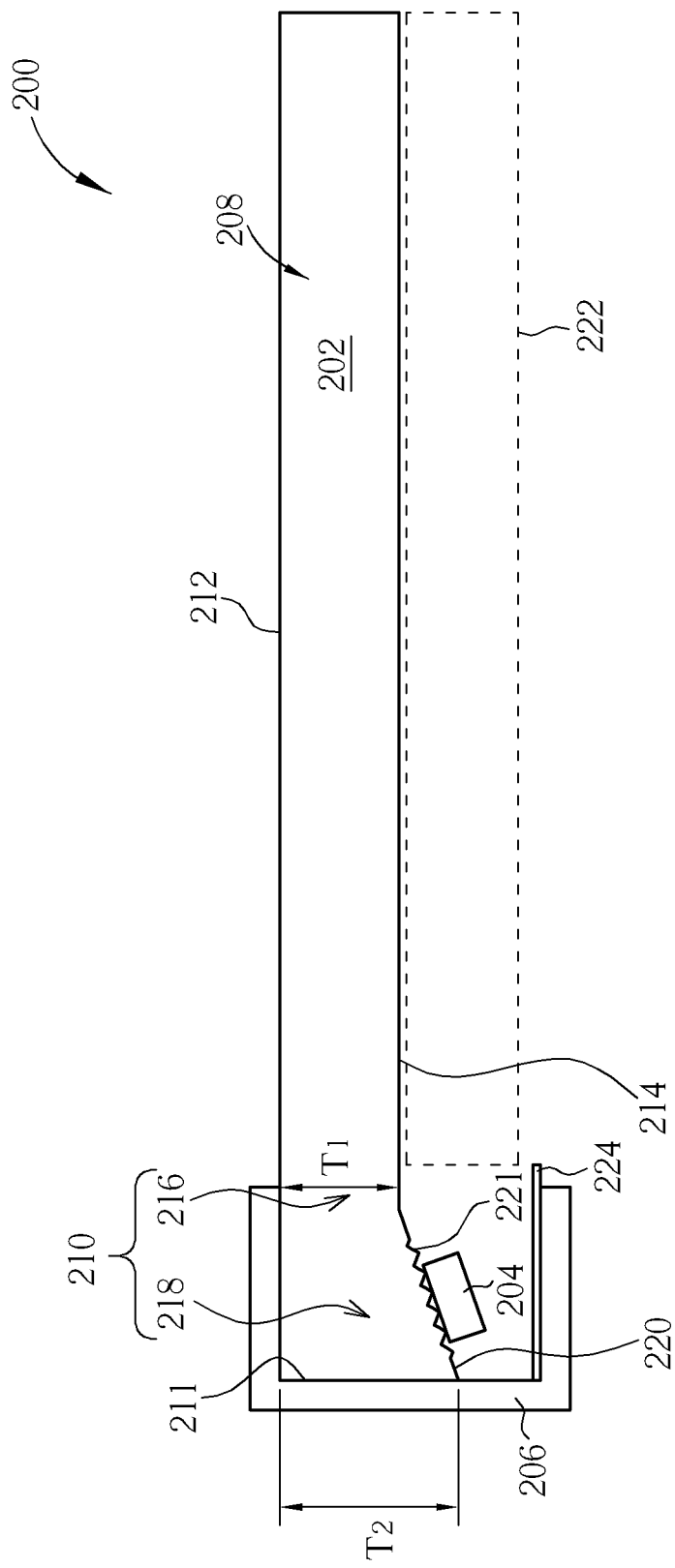
FIG. 3 is a side view of a backlight module according to a second embodiment of the present invention.

Please refer to FIG. 3, which is a side view of a backlight module 200 according to a second embodiment of the present invention. The backlight module 200 includes a light guide plate 202, a light emitting unit 204, and a reflection cover 206. The light guide plate 202 has a light exit portion 208 and a light entrance portion 210. The light exit portion 208 has a light exit surface 212 and a bottom reflection surface 214 opposite to the light exit surface 212. The light entrance portion 210 has a first section 216 connected to the light exit portion 208 and a second section 218 away from the light exit portion 208. As shown in FIG. 3, the second section 218 is an inclined-surface section with a gradually-increased thickness, meaning that any thickness of the second section 218 (e.g. the maximum thickness $T_2$ as shown in FIG. 3) is greater than a thickness $T_1$ of the first section 216. In other words, the average thickness of the second section 218 is greater than the thickness $T_1$ of the first section 216, so as to make the light entrance portion 210 form an inclined-surface structure extendedly protruding from the light exit portion 208. The light entrance portion 210 has a light entrance surface 220 extendedly formed between the first section 216 and the second section 218. Furthermore, in this embodiment, the light entrance surface 220 is adjacent to the bottom reflection surface 214 to define a containing space 222 cooperatively with the bottom reflection surface 214. The containing space 222 is located under the bottom reflection surface 214. Accordingly, when the backlight module 200 is integrated into a liquid crystal display device, the light guide plate 202 can utilize the containing space 22 to provide additional space for containing inner components of the liquid crystal display device, such as a printed circuit board, a flexible circuit board, or a heat-dissipating member, so as to increase efficiency of the backlight module 200 in use of its inner space.

The light emitting unit 204 is disposed on the light entrance surface 220 and is preferably an LED for emitting light to the light guide plate 202 via the light entrance surface 220. In this embodiment, a microstructure 221 is formed on the light entrance surface 220 for reducing the occurring probability of total reflection of the light, so as to increase light incident efficiency of the light emitting unit 204 relative to the light guide plate 202. As for the structural design of the microstructure 221, it is commonly seen in the prior art, such as a continuous tooth structure. The reflection cover 206 is disposed at a side of the light guide plate 202 to contain the light entrance portion 210 for reflecting the light emitted by the light emitting unit 204. Accordingly, the light can be emitted out of the light guide plate 202 via the light exit surface 212 more efficiently. Furthermore, since there is no need for the backlight module 200 to additionally dispose a containing space between the light entrance portion 210 of the light guide plate 202 and the reflection cover 206 to contain the light emitting unit 204, the light entrance portion 210 of the light guide plate 202 can abut against the reflection cover 206 tightly. In such a manner, the overall width of the backlight module 200 can be reduced accordingly so as to be advantageous to narrow a side frame of a liquid crystal display device where the backlight module 200 is installed.

In such a manner, via the design that the light emitting unit 204 is disposed on the light entrance surface 220, the light emitted by the light emitting unit 204 can be incident into the light guide plate 202 via the light entrance surface 220 more efficiently as shown in FIG. 3, and then be emitted out of the light guide plate 202 via the light exit surface 212 of the light exit portion 208. Accordingly, the backlight module 200 can provide light with sufficient brightness and uniform distribution.

In practical application, the backlight module 200 further includes a reflection pad 224 attached to the reflection cover 206 corresponding to the light emitting unit 204. Via the configuration that the reflection pad 224 is disposed under the light emitting unit 204, even if light emitted by the light emitting unit 204 is reflected by the light entrance surface 220, the backlight module 200 can still utilize the reflection pad 224 to reflect the light back into the light guide plate 202. Thus, efficiency of the backlight module 200 in use of light can be further improved.

Similarly, the light reflection design utilized by the backlight module 200 is not limited to the design that the reflection cover 206 is disposed at a side of the light guide plate 202 corresponding to the light entrance portion 210 as shown in FIG. 3. That is to say, the reflection cover 206 can be an omissible component for simplifying the structural design of the backlight module 200. On condition that the reflection cover 206 is omitted, the light entrance portion 210 can have a side reflection surface 211 instead. The side reflection surface 211 is adjacent to the light entrance surface 220 for reflecting the light emitted by the light emitting unit 204 instead of the reflection cover 206. As for how to form the side reflection surface 211 on the light entrance portion 210, the related design is commonly seen in the prior art, such as attaching a reflection tape onto the light entrance portion 210, and its related description therefore omitted herein.

It should be mentioned that the forming position of the light entrance surface 220 is not limited to the position as shown in FIG. 3. To be more specific, the light guide plate 202 can also utilize the design that the light entrance surface 220 is adjacent to the light exit surface 212 at the same side surface, to form a light guide structure similar to the light guide plate 102 in FIG. 2, so as to increase the design flexibility of the backlight module 200. As for the related description and configuration, they can be reasoned by analogy according to the first embodiment and therefore omitted herein.

Compared with the prior art, the present invention utilizes the design that the light emitting unit is disposed on the light entrance surface tilted relative to the light exit surface or the bottom reflection surface at the same side surface, to achieve the purpose that there is no need for the backlight module to additionally dispose a containing space between the side surface of the light guide plate and the reflection cover to contain the light emitting unit. In such a manner, the light guide plate can abut against the reflection cover tightly to reduce the overall width of the backlight module, so as to be advantageous to narrow a side frame of a liquid crystal display device where the backlight module is installed. Furthermore, the backlight module provided by the present invention can further utilize the containing space formed by the light entrance surface cooperatively with the light exit surface or the bottom reflection surface to contain the optical films located above the light guide plate or the components located under the light guide plate. Thus, efficiency of the backlight module in use of its inner space can be further improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A backlight module comprising:
a light guide plate having a first side surface, a second side surface, and a third side surface, the first side surface being located opposite to the second side surface, a height of the first side surface being greater than a height of the second side surface, the third side surface being located between the first side surface and the second side surface and having a light entrance surface and a light exit surface, the light entrance surface being connected to the first side surface and the light exit surface, being located at the same side of the light guide plate with the light exit surface, and being tilted upwardly relative to the light exit surface, the light exit surface being connected to the second side surface, an included angle being formed between the light entrance surface and the light exit surface; and
a light emitting unit disposed on the light entrance surface, light emitted by the light emitting unit being incident into the light guide plate via the light entrance surface and then being reflected by the first side surface to emit out of the light guide plate via the light exit surface.

2. The backlight module of claim 1, wherein the light entrance surface defines a containing space cooperatively with the light exit surface, and the containing space is located above the light exit surface.

3. The backlight module of claim 2 further comprising:
at least one optical film contained in the containing space.

4. The backlight module of claim 1, wherein a microstructure is formed on the light entrance surface.

5. The backlight module of claim 1, wherein the first side surface has a side reflection surface for reflecting light emitted by the light emitting unit.

6. The backlight module of claim 1 further comprising:
a reflection cover disposed on the light guide plate corresponding to the light entrance surface and the first side surface for reflecting light emitted by the light emitting unit.

7. The backlight module of claim 6 further comprising:
a reflection pad attached to the reflection cover corresponding to the light emitting unit for reflecting the light emitted by the light emitting unit.

8. A backlight module comprising:
a light guide plate having a light exit portion and a light entrance portion, the light exit portion having a light exit surface, the light entrance portion having a first section connected to the light exit portion and a second section away from the light exit portion, a thickness of the second section being greater than a thickness of the first section, the light entrance portion having a light entrance surface extendedly formed between the first section and the second section, the light entrance surface and the light exit surface being located at the same side of the light guide plate or respectively located at opposite sides of the light guide plate, the light entrance surface being tilted upwardly relative to the light exit surface, the light entrance portion further having a side reflection surface adjacent to the light entrance surface; and
a light emitting unit disposed on the light entrance surface for emitting light to be incident into the light guide plate via the light entrance surface and then be reflected by the side reflection surface to emit out of the light guide plate via the light exit surface.

9. The backlight module of claim 8, wherein the light entrance surface is adjacent to the light exit surface to define a containing space cooperatively with the light exit surface, and the containing space is located above the light exit surface.

10. The backlight module of claim 9 further comprising:
at least one optical film contained in the containing space.

11. The backlight module of claim 8, wherein the light exit portion further has a bottom reflection surface opposite to the light exit surface, the light entrance surface is adjacent to the bottom reflection surface to define a containing space cooperatively with the bottom reflection surface, and the containing space is located under the bottom reflection surface.

12. The backlight module of claim 8, wherein a microstructure is formed on the light entrance surface.

13. The backlight module of claim 8 further comprising:
a reflection cover disposed at a side of the light guide plate corresponding to the light entrance portion to contain the light entrance portion for reflecting light emitted by the light emitting unit.

14. The backlight module of claim 13 further comprising:
a reflection pad attached to the reflection cover corresponding to the light emitting unit for reflecting the light emitted by the light emitting unit.

* * * * *